United States Patent [19]

Moore et al.

[11] 4,106,906

[45] Aug. 15, 1978

[54] METHOD FOR SUPPRESSING WATER EVAPORATION USING A POLYBUTADIENE FILM

[75] Inventors: Kenneth L. Moore, China Lake; Russell Reed, Jr., Ridgecrest, both of Calif.

[73] Assignee: The United States of America as represented by the Secretary of the Navy, Washington, D.C.

[21] Appl. No.: 764,135

[22] Filed: Jan. 31, 1977

[51] Int. Cl.$^2$ ............................ B01J 1/18; E02B 1/00; E02B 3/00
[52] U.S. Cl. .................................. 21/60.5 A; 61/1 R; 427/385 R
[58] Field of Search ....................... 21/60.5 R, 60.5 A; 61/1 R; 526/335; 427/385 R

[56] References Cited

U.S. PATENT DOCUMENTS

| | | | |
|---|---|---|---|
| 2,907,627 | 10/1959 | Cummings | 21/60.5 A |
| 3,684,789 | 8/1972 | Yagi et al. | 526/335 |
| 3,738,807 | 6/1973 | Horowitz et al. | 21/60.5 A |

*Primary Examiner*—Morris O. Wolk
*Assistant Examiner*—Bradley Garris
*Attorney, Agent, or Firm*—R. S. Sciascia; Roy Miller; Thomas W. Hennen

[57] ABSTRACT

A continuous polymer film formed by air-activated cross-linking of polyfunctional prepolymers is applied to the surface of a body of water for suppressing evaporation.

4 Claims, 1 Drawing Figure

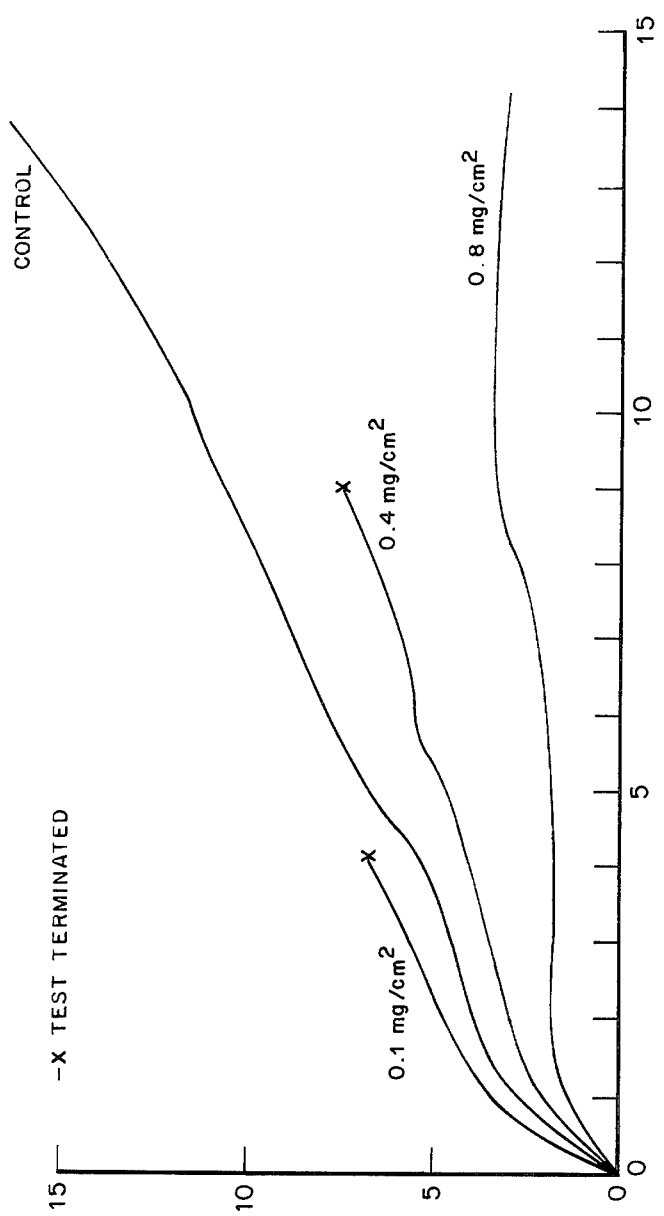

METHOD FOR SUPPRESSING WATER EVAPORATION USING A POLYBUTADIENE FILM

BACKGROUND OF THE INVENTION

1. Field of the Invention

This invention pertains to methods for preventing evaporation of liquids, and more particularly to such methods which employ surface coatings to form an evaporation barrier between water and the ambient atmosphere.

2. Description of the Prior Art

Various techniques have been devised for reducing water loses due to evaporation from storage reservoirs. These techniques typically involve the formation of monolayers of cetyl, stearyl, and behenyl alcohols. Mixtures of some of these substances are available commercially for use as evaporation suppressants. Certain of these alcohols have been used in large-scale evaporation control work. Early experiments used metering dispensers placed in the water as means of dispersing the alcohols over the water surface. In the largest experiment to date, two crop-dusting airplanes were used to coat a 30,000 acre reservoir with a 1:1 mixture of cetyl and stearyl alcohols; this succeeded in saving an estimated 15 million gallons per day.

Essential to the process of evaporation reduction by monolayer films is the ability to keep such films in a state of compression. Whenever the film is allowed to lapse from this condition, its ability to inhibit evaporation is severely degraded. Evaporation reductions claimed in large-scale efforts typically vary from 16 to 50%.

In view of the mobility of the relatively low molecular weight monofunctional alcohols such as octadecanol, they tend to accumulate on the shore in high wind conditions; therefore, relatively large amounts are required to maintain a hydrophobic monolayer film on the surface of a reservoir. Long chains would function more efficiently since the area covered per hydroxyl group would generally be expected to increase as molecular weight increases; in addition, volatilization of the film and migration to the edge of a tank or reservoir would be reduced.

SUMMARY OF THE INVENTION

According to the method of this invention a layer of polybutadiene prepolymer is applied to the surface of a body of water. This layer then reacts under ambient conditions with atmospheric oxygen to form an evaporation suppressing continuous polymer film. This film is formed by air-activated cross-linking of the polybutadiene prepolymer. Films formed in this manner are continuous in nature and are characterized by a high degree of flexibility and excellent resistance to wind and wave action. Break up in high velocity winds does occur, but the films will repair themselves when wind velocity drops below 15 miles per hour. Evaporation reductions in excess of 90% have been noted in both laboratory and field tests.

BRIEF DESCRIPTION OF THE DRAWING

The sole FIGURE is a graph plotting evaporation loss of water versus time.

DESCRIPTION OF THE PREFERRED EMBODIMENT

Polybutadiene was chosen for use in this invention because of its relatively high molecular weight and unsaturated structure. The presence of the carbon-carbon double bonds enhances rotation about the carbon-to-carbon bonds, an effect which tends to result in liquids rather than solid waxes. A liquid is more effective in this invention because it will spread more rapidly and uniformly over the surface of a body of water than would a solid. The physical properties of three commercially available hydroxyl terminated polybutadienes are shown in Table I.

Table 1

| Polymer | Vendor | Viscosity, P, 30° C | Functionality | Av mol wt |
|---|---|---|---|---|
| Polymer R | Arco | 40 | 2.1 | 2970 |
| R-45 M | Arco | 50 | 2.3 | 3000 |
| R-15 | Arco | 200 | 2.6 | 3700 |

Several other materials were investigated, including polybutadiene-acrylonitrile, carboxyl-terminated polybutadiene containing 15 weight % acrylonitrile, and carboxyl-terminated polybutadiene containing 15 weight % styrene. All of these materials formed continuous films but were not as effective as hydroxyl terminated polybutadiene in arresting the evaporating process.

The CH content of these prepolymers is some 100 units per OH as compared to 18 carbon-hydrogen groups for octadecanol. Moreover, the prepolymers, when applied to water in a solvent such as 1-butanol or toluene, spread rapidly; soon thereafter a continuous tacky film may be observed on the surface; a process termed "air-activated cross-linking". It is postulated that a rapid oxidative cross-linking occurs since the allylic hydrogens (circled below) are readily removed by oxidation.

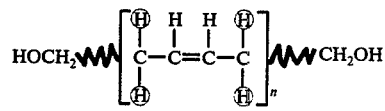

Pendant vinyl groups which are present due to 1, 2 addition during polymerization may also be involved in the cross-linking. The terminal hydroxyl (OH) groups probably do not enter into the cross-linking reaction. Oxidative cross-linking of hydroxyl terminated polybutadiene at elevated temperatures is under investigation at the present time. While extensive work with hydroxyl terminated polybutadiene has been performed as part of solid rocket propellant research, there does not appear to be any definitive information on kinetics of cross-linking at ambient temperatures on a water surface. The polymers used in the experiments contained no antioxidants. However, the rate of cross-linking can be tailored through the addition of common antioxidants such as phenyl-$\beta$-naphthylamine or 2, 6-ditertiary butyl phenol derivatives. Also, CA0-14, a product of Ashland Chemical Corporation, could be used.

EXPERIMENTAL RESULTS

The first evaporation suppression experiments were performed in a flow hood where temperature, humidity, and air velocity could be accurately determined. Petri dishes filled with water were placed on opposite sides of a two pan balance; the system was then brought to equilibrium. One dish was treated with a small quantity of prepolymer solution applied to the water surface by a pipet. The low relative humidity of the environment (about 20 to 30%) was conducive to visual observation of relative evaporation rates within a few hours.

It was noted that films formed on the surface as the solvent evaporated, and that after a few hours these films resisted penetration by thermometers and thermo-couple probes. On closer examination it became evident that the prepolymer had cross-linked to form continuous sheets of polymer which had arrested the evaporation process.

Field tests were undertaken to evaluate the various hydroxyl terminated polybutadiene materials under actual conditions of wind, waves, and exposure to solar radiation. Two sets of experiments were performed. In the first, 3 liter beakers were filled with water and set on a diffuse white surface exposed to full sunlight throughout the day. One of these was left as a control while the others were treated with various prepolymers dissolved in solvents such as 1-butanol and toluene. Polymer content of the solutions varied from 5 to 30%. First applications were done by quiescent metered surface dispersal, although it soon became apparent that the solutions could just as easily be applied by spraying as well as by pouring the solution into the water. The initial stage of film formation is a very rapid process during which the solutions spread out over the entire water surface with velocities on the order of 6 to 10 centimeters per second depending on polymer concentration. This produces a streaked, swirling fluid which then coalesces into a clear, slightly viscous layer on top of the water.

A variety of surfactants have been used successfully for obtaining increased spreading velocities while improving the uniformity of film thickness. However, these have an adverse effect on film properties. Film formation begins almost immediately and reductions in evaporation can be noted within 8 hours. The films at this point are penetrable by blunt objects such as thermometers and thermo-couple probes and, breaches formed by such objects heal almost immediately.

Several concentrations of polymer were applied to determine optimum quantities required for effective suppression of water losses. The value of 0.8 mg/cm$^2$, obtained from the flow hood tests, was applied to the outdoor tests together with 0.1 mg/cm$^2$ and 0.4 mg/cm$^2$. Evaporation losses from surfaces treated with these concentrations of R-15 are plotted in the drawing together with the control losses. Similar results were obtained with the other polymers. It will be noted from the graphs of the drawing that too low a concentration of polymer accelerates the evaporation process. The temperature of water treated with 0.8 mg/cm$^2$ rose some 4° C as compared to the control vessel temperature. It is felt that this effect is largely confined to shallow layers and would not be appreciable in deeper bodies of water or in dynamic systems with a continual influx of cool water.

There were no great differences in the performance of the three polymers listed in Table I, although their effectiveness increased with average molecular weight and functionality of the prepolymers.

As is evident in the graph, the net evaporation reduction at the end of 9 days was some 72% for 0.8 mg/cm$^2$ of R-15. The tests were discontinued after 14 days, by which time the net reduction in evaporation was in excess of 80%. The films broke apart in high wind conditions, when waves measuring 15 centimeters from crest to valley were observed, but re-formed successfully throughout the 2 week test period, during which wind velocities in excess of 30 miles per hour were recorded several times.

The second set of experiments was carried out in four 10 centimeter deep pans measuring 60 centimeters in width and 120 centimeters in length. The pans were situated with their longer sides parallel to the predominant wind direction and filled to within 1 centimeter of the top to maximize wave effects. Coatings of Polymer R, R-45 M, and R-15 were applied to three pans in the same quantities as were used in the beaker tests; the fourth pan was left as a control. During the ensuing 4 weeks, when winds in excess of 25 miles per hour were encountered on numerous occasions, films on the three coated surfaces successfully resisted breakup due to wind and wave action. No water was lost from these three pans. In contrast, the uncoated pan was empty at the end of the first week due to the combined effect of splash and evaporation losses.

In-situ formation of polymer films has been demonstrated in small scale tests as an effective technique for reducing water losses by evaporation. This method results in water saving in excess of 80%, as compared to free evaporation. The films thus formed are flexible and repair themselves; they may also be repaired through addition of new quantities of prepolymer solution. An ideal application of this method would be the conservation of water in specially constructed reservoirs which are free of marine life and are intended only for storage of water for agricultural and industrial consumption. This method could also be used to heat water, for example, by the use of solar energy. In addition to hydroxyl terminated polybutadiene, other polymers which are suitable include polybutadiene acrylic acid copolymer, or polybutadiene acrylonitrite copolymer and carboxy terminated polymers.

Lower molecular weight prepolymers, i.e., 1000-3000 should also work to suppress evaporation, but they are generally not commercially available. Higher molecular weight prepolymers, i.e., 5,000-10,000 may also work. Functionality of OH could probably be increased to 3 to 5 or even greater.

Long chains would function more efficiently since the area covered per hydroxyl group would generally be expected to increase as molecular weight increases. The hydroxyl group serves to adhere the film to the water surface via hydrogen bonding.

Common antioxidants such as those used in polybutadiene rubber or natural rubber will work in the present invention as will phenyl-$\beta$-naphthylamine.

Other suitable polymers include polybutadiene acrylic acid copolymer. In addition to toluene or n-butanol, any hydrocarbon solvent such as benzene, gasoline, kerosene, napthas, or chlorinated solvents could be used. Low viscosity and high volatility are important characteristics. The solvent should cause the prepolymer to spread rapidly, but it should evaporate rapidly to avoid interfering with film formation.

1. A method for suppressing evaporation from a body of water which has a surface exposed to an ambient atmosphere consisting of the steps of:
   (a) applying a solution consisting essentially of polybutadiene prepolymer to said surface of said body of water; and (b) cross-linking, by air-activated cross-linking under ambient conditions, said prepolymer to form an evaporation suppressing continuous polymer film on said surface of said body of water.

2. The method of claim 1 wherein said polybutadiene prepolymer is hydroxyl-terminated polybutadiene of 3000 to 4000 molecular weight.

3. The method of claim 1 wherein said polybutadiene prepolymer has pendant vinyl groups.

4. The method of claim 1 wherein said solution of prepolymer contains an antioxidant.

* * * * *